(12) United States Patent
Baba et al.

(10) Patent No.: US 7,343,687 B2
(45) Date of Patent: Mar. 18, 2008

(54) INSTRUMENT DEVICE

(75) Inventors: Hideto Baba, Niigata (JP); Atsushi Fujita, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 204 days.

(21) Appl. No.: 10/552,035

(22) PCT Filed: Apr. 16, 2004

(86) PCT No.: PCT/JP2004/005518

§ 371 (c)(1),
(2), (4) Date: Oct. 3, 2005

(87) PCT Pub. No.: WO2004/097343

PCT Pub. Date: Nov. 11, 2004

(65) Prior Publication Data

US 2006/0236915 A1    Oct. 26, 2006

(30) Foreign Application Priority Data

Apr. 25, 2003    (JP)    ............................. 2003-121484

(51) Int. Cl.
*G01D 11/28*    (2006.01)
(52) U.S. Cl. ................ 33/286; 116/62.1; 116/DIG. 36; 362/29
(58) Field of Classification Search ................ 116/288, 116/284, 286, 287, DIG. 5, DIG. 6, DIG. 36, 116/62.1, 62.4, 305; 362/26, 27, 29, 30
See application file for complete search history.

(56) References Cited

U.S. PATENT DOCUMENTS

| | | | | |
|---|---|---|---|---|
| 657,331 A | * | 9/1900 | Christensen | ................. 362/29 |
| 2,173,316 A | * | 9/1939 | Sproule | ...................... 362/300 |
| 2,189,535 A | * | 2/1940 | Stuerzl | ......................... 362/28 |
| 2,738,759 A | * | 3/1956 | Hardesty | .................... 116/286 |
| 2,831,453 A | * | 4/1958 | Hardesty | .................... 116/288 |
| 4,004,546 A | * | 1/1977 | Harland | ..................... 116/288 |
| 4,215,647 A | * | 8/1980 | Fukasawa | ................... 116/286 |
| 4,761,715 A | * | 8/1988 | Brooks | ........................ 362/23 |
| 4,935,850 A | * | 6/1990 | Smith, Jr. | .................... 362/27 |
| 4,970,400 A | * | 11/1990 | Muramatsu | .............. 250/463.1 |
| 5,353,735 A | * | 10/1994 | Arai et al. | .................... 362/23 |

(Continued)

FOREIGN PATENT DOCUMENTS

JP    48-21873 Y    6/1973

(Continued)

*Primary Examiner*—R. Alexander Smith
(74) *Attorney, Agent, or Firm*—McDermott Will & Emery LLP

(57) ABSTRACT

This invention provides an instrument device including: a dial having scale marks; a pointer pointing the scale marks and provided in front of the dial; a light source provided behind the dial and supplying light to the pointer to cause the pointer to emit light; and a cover provided in front of the pointer, the scale marks and the pointer being visually confirmed through the cover, wherein a reflection member is provided at a part of the cover corresponding to a rotation center of the pointer; a reflection part is provided on the dial; and the reflection part is illuminated with light emitted from the pointer and light reflected and scattered by the reflection member after being emitted from the pointer.

8 Claims, 2 Drawing Sheets

U.S. PATENT DOCUMENTS

| | | | |
|---|---|---|---|
| 6,379,015 B2 * | 4/2002 | Wilhelm et al. | 362/29 |
| 6,663,251 B2 * | 12/2003 | Calvert | 362/23 |
| 6,926,417 B2 * | 8/2005 | Mikami | 362/23 |
| 6,955,438 B2 * | 10/2005 | Ishii | 362/29 |
| 2006/0185576 A1 * | 8/2006 | Tane | 116/288 |

FOREIGN PATENT DOCUMENTS

| | | |
|---|---|---|
| JP | 5-90323 U | 12/1993 |
| JP | 6-347299 A | 12/1994 |
| JP | 7-89235 A | 4/1995 |
| JP | 2003-21544 A | 1/2003 |
| JP | 2003-140576 A | 5/2003 |
| JP | 2007064682 A * | 3/2007 |

* cited by examiner

INSTRUMENT DEVICE

This application is the U.S. National Phase under 35 U.S.C. 371 of International Application No. PCT/JP2004/005518, filed Apr. 16, 2004, which in turn claims the benefit of Japanese Application No. 2003-121484, filed Apr. 25, 2003, the disclosures of which Applications are incorporated by reference herein in their entirety.

TECHNICAL FIELD

The present invention relates to instrument devices such as ones mounted on a vehicle including a car and the like and particularly to an instrument device characterized by a lighting structure.

BACKGROUND ART

Conventional instrument devices of this type are provided with an analog meter, for example, and the analog meter is provided with a display board and a pointer. Scale marks and numbers corresponding to rotation of the pointer are formed on the display board. The display board is made of a translucent substrate and shielded from light by black printing except for portions used for display, such as the scale marks and letters. Transmission illumination by a light source provided behind the display board enables the scale marks and the letters to be displayed. A front face of the meter is provided with a half-transparent protection cover colored with a dark color. The protection cover protects the meter and reduces an incident amount of external light or an amount of internal light. Since the display light of the meter having high emission brightness is reduced by the protection cover, only the displays such as the scale marks and the letters and the pointer stand out in darkness to be displayed without showing inside of the protection cover (see, for example, JP 07-098235 A).

However, since only the displays such as the scale marks and the letters and the pointer stand out in darkness to be displayed in the conventional instrument device, the illumination of the display lacks in savor and novelty.

The present invention has been accomplished in view of the above-described circumstances, and an object thereof is to provide an instrument device capable of performing a novel illumination.

DISCLOSURE OF THE INVENTION

In order to attain the above object, the present invention provides an instrument device comprising: a dial having scale marks; a light emitting pointer pointing the scale marks and provided in front of the dial; and a cover provided in front of the pointer, the scale marks and the pointer being visually confirmed through the cover, wherein a reflection member is provided at a part of the cover corresponding to a rotation center of the pointer; a reflection part is provided on the dial and/or in the vicinity of the dial; and the reflection part is illuminated with light emitted from the pointer and light reflected and scattered by the reflection member after being emitted from the pointer.

Also, this invention provides an instrument device comprising: a dial having scale marks; a light emitting pointer pointing the scale marks and provided in front of the dial; a cover provided in front of the pointer, the scale marks and the pointer being visually confirmed through the cover, wherein a reflection member is provided at a rotation center of the pointer; a reflection part is provided on the dial and/or in the vicinity of the dial; and the reflection part is illuminated with light emitted from the pointer and light reflected and scattered by the reflection member after being emitted from the pointer.

Also, this invention provides an instrument device comprising: a dial having scale marks; a pointer pointing the scale marks and provided in front of the dial; a light source provided behind the dial and supplying light to the pointer to cause the pointer to emit light; and a cover provided in front of the pointer, the scale marks and the pointer being visually confirmed through the cover, wherein a reflection member is provided at a rotation center of the pointer; a reflection part is provided on the dial and/or in the vicinity of the dial; and the reflection part is illuminated with light emitted from the pointer and light reflected and scattered by the reflection member after being emitted from the pointer. The reflection part is inclined to the reflection member according to this invention.

The reflection part is cone-shaped according to this invention.

The cone-shaped reflection part is provided at a position corresponding to the scale marks of the dial according to this invention.

The cover has a low light transmission rate according to this invention.

BEST MODE FOR CARRYING OUT THE INVENTION

Figure 1:
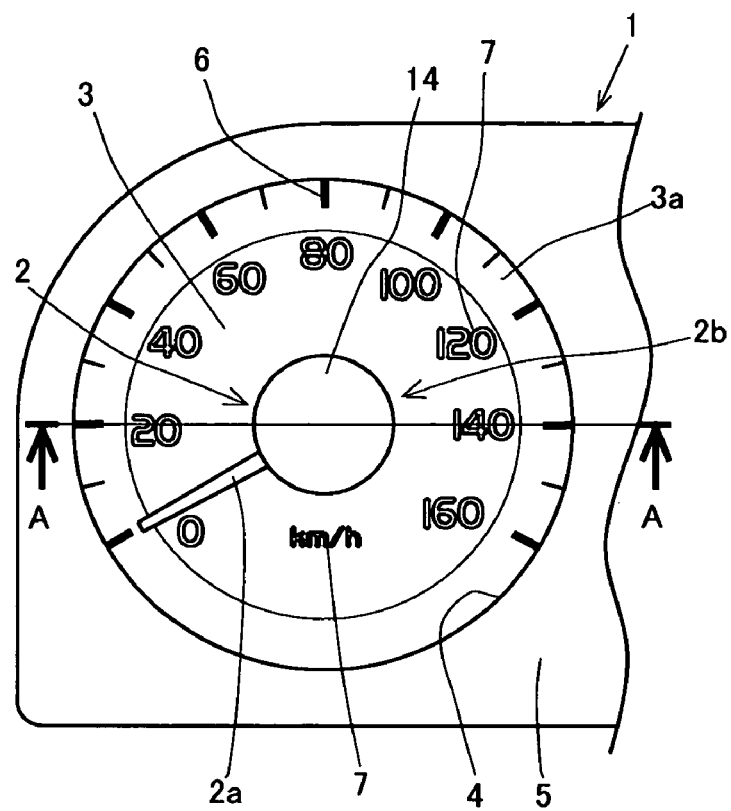
FIG. 1 is a front view of a first embodiment of this invention.
Figure 2:
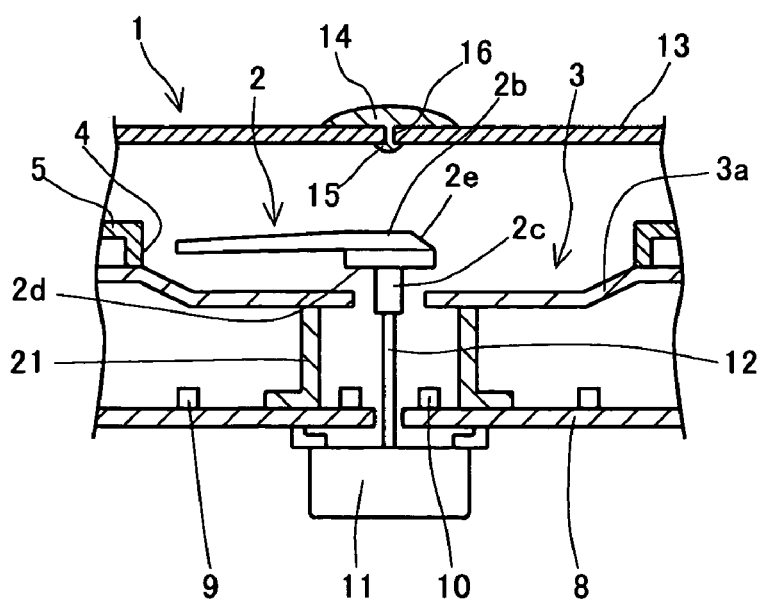
FIG. 2 is a sectional view showing A-A section of FIG. 1.

A first embodiment of this invention is shown in FIGS. 1 and 2, and one example of application of this invention to an instrument device of a car will hereinafter be described.

An instrument device 1 according to this embodiment is provided with a pointer 2, a dial 3 positioned behind the pointer 2, an opening 4, and a facing board 5 made from synthetic resin as shown in FIG. 1, the facing board 5 having the opening 4 so as to expose the dial 3 from the opening 4.

The instrument device 1 is a meter for indicating a speed of the vehicle, and the pointer 2 has a stick-like indicator 2a and a rotation center 2b which is the center of rotation of the pointer 2. The indicator 2a and the rotation center 2b are integrally formed from a transparent synthetic resin. The indicator 2a emits light when it receives light from a light source which will be described later in this specification and is provided behind the dial 3.

The dial 3 is provided with scale marks 6 and letters 7 representing numbers and units indicative of speeds corresponding to the scale marks 6 and used for indicating the speed. The dial 3 is formed of a board-shaped substrate which is made from a transparent synthetic resin and a light-shielding black coating is printed on the dial 3 except for the scale marks 6 and the letters 7. Portions of the scale marks 6 and the letters 7 are so formed as to transmit light and emit light when they receive the light from the light source described later in this specification. The portions of the scale marks 6 and the letters 7 may be formed from a light transmitting colored coating. A cone-shaped reflection part 3a is formed on a periphery of the opening 4 (adjacent to the opening 4) of the facing board 5 of the dial 3. The reflection part 3a is provided with the scale marks 6 of the dial 3. The reflection part 3a is colored with a light shielding silver color as a ground color.

A circuit board 8 is provided behind the dial 3, and a first light source 9 for illuminating the scale marks 6 and the letters 7 of the dial 3 and a second light source 10 for illuminating the pointer 2 are provided on one side of the circuit board 8 close to the dial 3. An instrument main body 11 for rotation driving the pointer 2 is provided behind the circuit board 8.

The circuit board 8 is a hard circuit board made from a glass epoxy resin, and an electrode pattern (not shown) is formed on a surface of the circuit board 8.

The first and second light sources 9 and 10 are surface-mount light emitting diodes of a chip type, and the light emitting diode 9 emits red light while the light emitting diode 10 emits white light.

The instrument main body 11 is of a cross coil type in this embodiment without limitation thereto. A stepping motor may be used as the instrument main body 11. A driving shaft 12 extends from the instrument main body 11, which is pressed into a boss 2c provided on the rotation center 2b of the pointer 2 to be connected to the pointer 2, thereby driving the pointer 2. The indicator 2a of the pointer 2 thus driven by the instrument main body 11 points the scale marks 6 on the dial 3.

In FIG. 2, a light-shielding wall which is denoted by 21 and made of white synthetic resin serves to prevent mixing of the colors of the light from the first and second light sources 9 and 10 and to guide all the light from the second light source 10 to the pointer 2.

The pointer 2 receives the light from the second light source 10 at a light receiving part 2d of the rotation center 2b, and the received light is reflected by a reflection face 2e to be oriented toward the indicator 2a.

A cover 13 having a low light transmission rate is provided in front of the pointer 2. The cover 13 is made from a black synthetic resin and has a light transmission rate of 30%. The cover 13 has a plate-like shape and is almost parallel to the board of the dial 3. A reflection member 14 is provided at a part of the cover 13 corresponding to the rotation center 2b of the pointer 2. The reflection member 14 has a pin 15 on its back face, and the pin 15 is fixed to the cover 13 in such a manner that the pin 15 is melted by heating after being inserted into a through-hole 16 provided on the cover 13. The fixing method is not limited to the above, and ultrasonic welding may be employed as the fixing method. The reflection member 14 is black on its front face, but a back face thereof, which is on the side of the pointer 2 and the dial 3, is white. The white color may be realized by coating or by the use of a white synthetic resin.

The reflection part 3a is inclined toward the reflection member 14. The reflection member 14 is used for covering the rotation center 2b so that the rotation center 2b of the pointer 2 is not seen from a driver who visually confirms the instrument device 1.

With such constitution, the scale marks 6 and the letters on the dial 3 and the pointer 2 are illuminated with the light emitted from the first and second light sources 9 and 10 to emit light, so that the scale marks 6 and the letters 7 on the dial 3 and the pointer 2 are visually confirmed through the cover 13. The rotation center 2b of the pointer 2 is so exposed that the light from the second light source 10 illuminates the reflection part 3a directly from the rotation center 2b and is simultaneously cast on the reflection member 14 from the rotation center 2b of the pointer 2 to be reflected at the reflection member 14 and scattered toward the reflection part 3a, thereby illuminating the reflection part 3a. Thus, the illuminated reflection part 3a realizes a stereoscopic form as viewed through the cover 13. Thus, it is possible to provide the instrument device capable of performing novel display. Since the illumination of the reflection part 3a is achieved by the use of the light from the pointer 2, the constitution is simple to reduce the cost.

Though the reflection part 3a is colored with the silver color in this embodiment in order to reflect the light from the reflection member 14 well, the color is not limited to silver and can be selected depending on a design of the instrument device 1. Also, though the reflection part 3a is cone-shaped in this embodiment, the reflection part 3a can be flat without the elevation insofar as it has a bright color suitable for reflection, such as white, gray, and silver.

The reflection member 14 is one of the components in this embodiment, but the constitution is not limitative. The reflection member 14 may be realized as a print on the back face of the cover 13 insofar as it reflects light to the reflection part 3a. In this case, a two-layer print layer is formed wherein one of the layers closer to the cover 13 is colored with an arbitrary color such as black, while the other layer closer to the pointer 2 is colored with a bright color which reflects light well, such as white.

Figure 3:
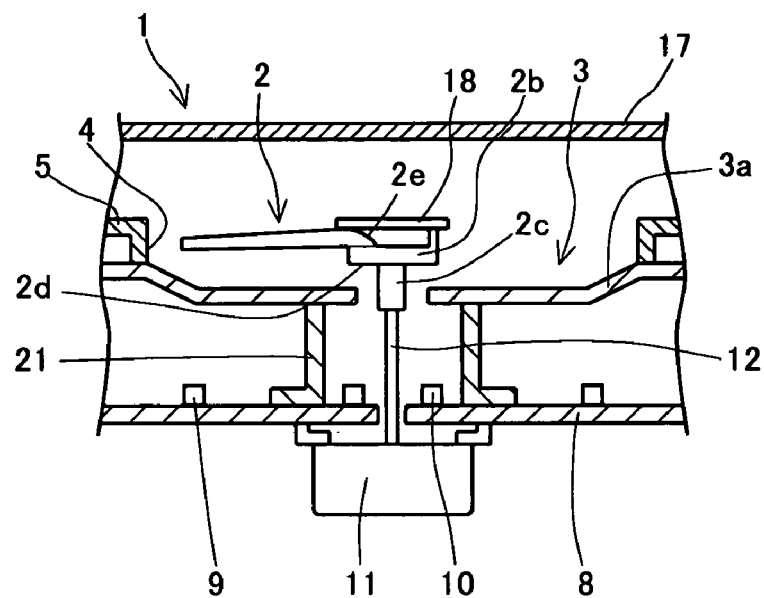
FIG. 3 is a sectional view showing a second embodiment of this invention.

Hereinafter, a second embodiment of this invention will be described using FIG. 3. Note that components identical or equivalent to those of the first embodiment are denoted by the same reference numerals to omit detailed descriptions for them.

Though the cover 13 of the first embodiment has the plate-like shape which is almost parallel to the board of the dial 3, a cover 17 of this embodiment is curved in vertical directions of an instrument device 1. Therefore, the reflection member 14 of the first embodiment has difficulty in reflecting light well to the reflection part 3a. Accordingly, in this embodiment, a disk-like reflection member 18 is provided at the rotation center 2b of the pointer 2. The reflection member 18 is fixed to the rotation center 2b by an arbitrary method such as welding. With such constitution, the light from the second light source 10 illuminates directly the reflection part 3a from the rotation center 2b and oriented from the rotation center 2b to the reflection member 18 to be reflected by the reflection member 18 and scattered toward the reflection part 3a, thereby illuminating the reflection part 3a. Thus, the illuminated reflection part 3a enables the display on the instrument device 1 to be visually confirmed through the cover 13. Thus, an effect similar to that of the first embodiment is achieved.

Though the reflection part 3a is cone-shaped in each of the foregoing embodiments, the embodiments are not limitative, and the reflection part 3a may be provided on a part of the dial 3.

Figure 4:
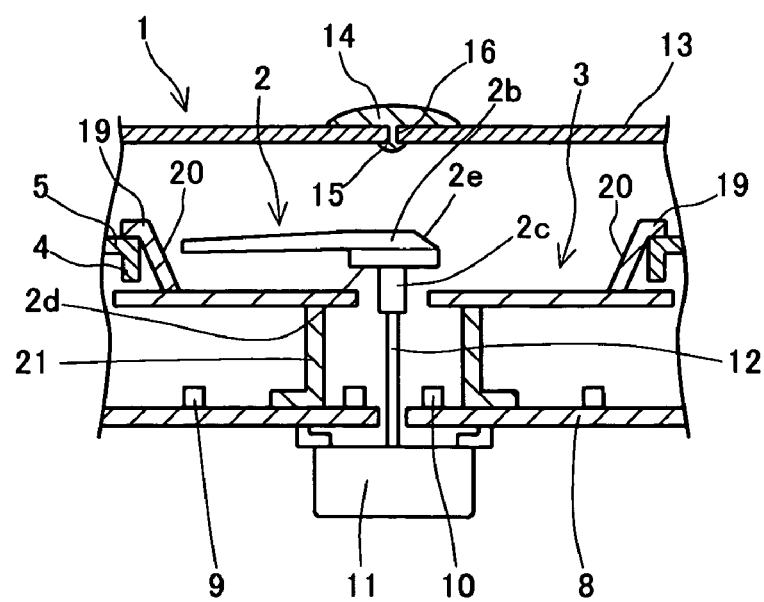
FIG. 4 is a sectional view showing a third embodiment of this invention.

Hereinafter, a third embodiment of this invention will be described by using FIG. 4. Note that components identical or equivalent to those of the foregoing embodiments are denoted by the same reference numerals to omit detailed descriptions for them.

Though the reflection part 3a is provided on the dial 3 in the foregoing embodiments, the embodiments are not limitative, and the dial 3 may have a plate-like shape. A ring-shaped member 19 may be provided at the opening 4 of the facing plate 5, and a reflection part 20 inclined to the reflection member 14 may be provided on the ring-shaped member 19. The ring-shaped member 19 is made from synthetic resin, and a surface thereof is colored with a silver color. With such constitution, the light from the second light source 10 illuminates the reflection member 14 from the rotation center 2b of the pointer 2 to be reflected by the reflection member 14 and scattered toward the reflection part 20, thereby illuminating the reflection part 20. The thus-illuminated reflection part 20 enables the display on the instrument device 1 to be visually confirmed through the cover 13. Thus, an effect similar to that of each of the foregoing embodiments is achieved.

In this embodiment, the reflection part 3a may be formed on the dial 3 in the same manner as in the foregoing embodiments. With such constitution, a more stereoscopic form is visually realized by the reflection part 3a and the ring-shaped member 19.

The first light source 9 and the second light source 10 are provided as separate light sources in the foregoing embodiments since they are different in light color, but the foregoing embodiments are not limitative, and a light source is used as the first and second light sources when the pointer 2 and the dial 3 are illuminated with light of identical color.

Though the scale marks 6 and the pointer 2 emit light upon supply of light from the first light source 9 and the second light source 10 in the foregoing embodiments, the embodiments are not limitative, and the scale marks 6 and the pointer 2 may be modified to be self-luminous. In this case, the dial 3 may be formed of a light emitting element such as an electroluminescence so that the scale marks 6 emit light in a self-luminous manner. Also, the indicator 2a and the rotation center 2b are provided with an electroluminescence so that the pointer 2 emits light in a self-luminous manner.

Though the covers 13 and 17 are low in light transmission rate in the foregoing embodiments, an effect similar to that of each of the foregoing embodiments is achieved by the use of a cover with a high light transmission rate.

INDUSTRIAL APPLICABILITY

This invention is applicable to an instrument device provided with a dial having scale marks and a light emitting pointer pointing the scale marks and provided in front of the dial.

The invention claimed is:

1. An instrument device comprising:
a dial having scale marks;
a light emitting pointer pointing the scale marks and provided in front of the dial; and
a cover provided in front of the pointer, the scale marks and the pointer being visually confirmed through the cover, wherein
a reflection member is provided at a part of the cover corresponding to a rotation center of the pointer;
a reflection part is provided on the dial and/or in the vicinity of the dial; and
the reflection part is illuminated with light emitted from the pointer and light reflected and scattered by the reflection member after being emitted from the pointer.

2. The instrument device according to claim 1, wherein the reflection part is inclined to the reflection member.

3. The instrument device according to claim 2, wherein the reflection part is cone-shaped.

4. The instrument device according to claim 3, wherein the cone-shaped reflection part is provided at a position corresponding to the scale marks of the dial.

5. The instrument device according to claim 1, wherein the cover has a low light transmission rate.

6. An instrument device comprising:
a dial having scale marks;
a pointer pointing the scale marks and provided in front of the dial;
a light source provided behind the dial and supplying light to the pointer to cause the pointer to emit light; and
a cover provided in front of the pointer, the scale marks and the pointer being visually confirmed through the cover, wherein
a reflection member is provided at a part of the cover corresponding to a rotation center of the pointer;
a reflection part is provided on the dial and/or in the vicinity of the dial; and
the reflection part is illuminated with light emitted from the pointer and light reflected and scattered by the reflection member after being emitted from the pointer.

7. An instrument device comprising:
a dial having scale marks;
a light emitting pointer pointing the scale marks and provided in front of the dial;
a cover provided in front of the pointer, the scale marks and the pointer being visually confirmed through the cover, wherein
a reflection member is provided at a rotation center of the pointer;
a reflection part is provided on the dial and/or in the vicinity of the dial; and
the reflection part is illuminated with light emitted from the pointer and light reflected and scattered by the reflection member after being emitted from the pointer.

8. An instrument device comprising:
a dial having scale marks;
a pointer pointing the scale marks and provided in front of the dial;
a light source provided behind the dial and supplying light to the pointer to cause the pointer to emit light; and
a cover provided in front of the pointer, the scale marks and the pointer being visually confirmed through the cover, wherein
a reflection member is provided at a rotation center of the pointer;
a reflection part is provided on the dial inclined toward the reflection member and/or in the vicinity of the dial; and
the reflection part is illuminated with light emitted from the pointer and light reflected and scattered by the reflection member after being emitted from the pointer.

* * * * *